Dec. 31, 1957 F. J. HAUPT ET AL 2,818,468

MEANS TO FACILITATE THE HANDLING OF TELEGRAPH STORAGE TAPE

Filed Feb. 3, 1953 2 Sheets-Sheet 1

*INVENTORS*
F. J. HAUPT
W. J. RAMHORST
*BY* W. R. Marsh
ATTORNEY

Dec. 31, 1957 F. J. HAUPT ET AL 2,818,468

MEANS TO FACILITATE THE HANDLING OF TELEGRAPH STORAGE TAPE

Filed Feb. 3, 1953 2 Sheets-Sheet 2

INVENTORS
F. J. HAUPT
W. J. RAMHORST

BY M. R. Marsh

ATTORNEY

United States Patent Office 2,818,468

Patented Dec. 31, 1957

2,818,468

MEANS TO FACILITATE THE HANDLING OF TELEGRAPH STORAGE TAPE

Frank J. Haupt, Bergenfield, N. J., and William J. Ramhorst, New York, N. Y., assignors to The Western Union Telegraph Company, New York, N. Y., a corporation of New York Application February 3, 1953, Serial No. 334,864

2 Claims. (Cl. 178—17.5)

This invention relates primarily to means to facilitate the handling of telegraph storage tape and more particularly to means for adapting perforated telegraph storage tape to be more readily fed through a restricted guideway into a tape storage bin.

In modern telegraph switching systems, it is the general practice at central switching offices to automatically and temporarily store messages in perforated tapes one or more times incident to relaying the messages through the switching center. The signal controlled reperforating mechanism for perforating the tape in accordance with received signals have tape transmitters associated therewith which are controlled by the perforated tape to subsequently transmit the stored signals to a circuit. In some systems such transmitters transmit directly to a line circuit while in other systems such transmitters send through cross-office circuits to a sending position where the signals are stored in a second tape for controlling a second transmitter sending to the desired outgoing circuit. The circuits over which the stored signals are transmitted are not always immediately available and hence a quantity of perforated tape representing unsent signals may accumulate between the signal controlled reperforator preparing the tape and the tape transmitter controlled by the tape. In double storage systems, the cross-office transmission is usually faster than the line circuit transmission and in such cases there may at times be a considerable accumulation of unsent perforated tape between the perforator and transmitter. In order to prevent tangling and possible damage, tearing and intermingling of tapes from one reperforator with those of an adjacent reperforator, and to facilitate the subsequent proper feeding and movement of the tape into its associated transmitter, tape storage bins are employed, one for each tape. In order to provide storage bins of adequate capacity, they are usually located below the reperforator and transmitter and each bin has a relatively narrow chute or guideway through which the tape is pushed into the bin and pulled therefrom. The tape must be pushed into the bin through the same guideway through which it is pulled from the bin in order that the length of tape and the unsent signals be kept to a minimum when the transmitter catches up with the reperforator. Where the reperforator transmitter and associated control equipment are located on shelves one above the other, as is the usual arrangement, and the storage bins located below table levels because of space requirements, the highest reperforator set must have a relatively long chute leading thereto. In pushing the relatively flexible tape, and the perforations therein add to its flexibility, down the chute, any slight friction or drag of the tape in the chute is likely to impede its movement and cause it to jam. When such a tape jam occurs, additional tape prepared by the reperforator accumulates in a tangled mass between the reperforator and transmitter and may temporarily tie up such a position and require the services of an attendant to place the set back in operative condition.

In accordance with the above, it was one of the primary objects of the present invention to provide means to eliminate or greatly reduce the likelihood of perforated tape jamming in a tape chute such as one leading to a tape storage bin.

A more specific object of the invention is to provide means for stiffening the perforated tape as it leaves the reperforator to enable it to be more readily pushed into and through a tape chute leading to a tape storage bin.

Another object of the invention is to provide means for stiffening a perforated tape without impairing its utility when subsequently employed in a tape transmitter.

Still another object of the invention is to provide means for progressively crimping the perforated tape longitudinally thereof and in areas wherein no perforations occur.

The above and further objects of the invention will be more apparent hereinafter in the following detailed description thereof where reference is made to the accompanying drawings wherein.

Figures 1, 2, 3, 4:
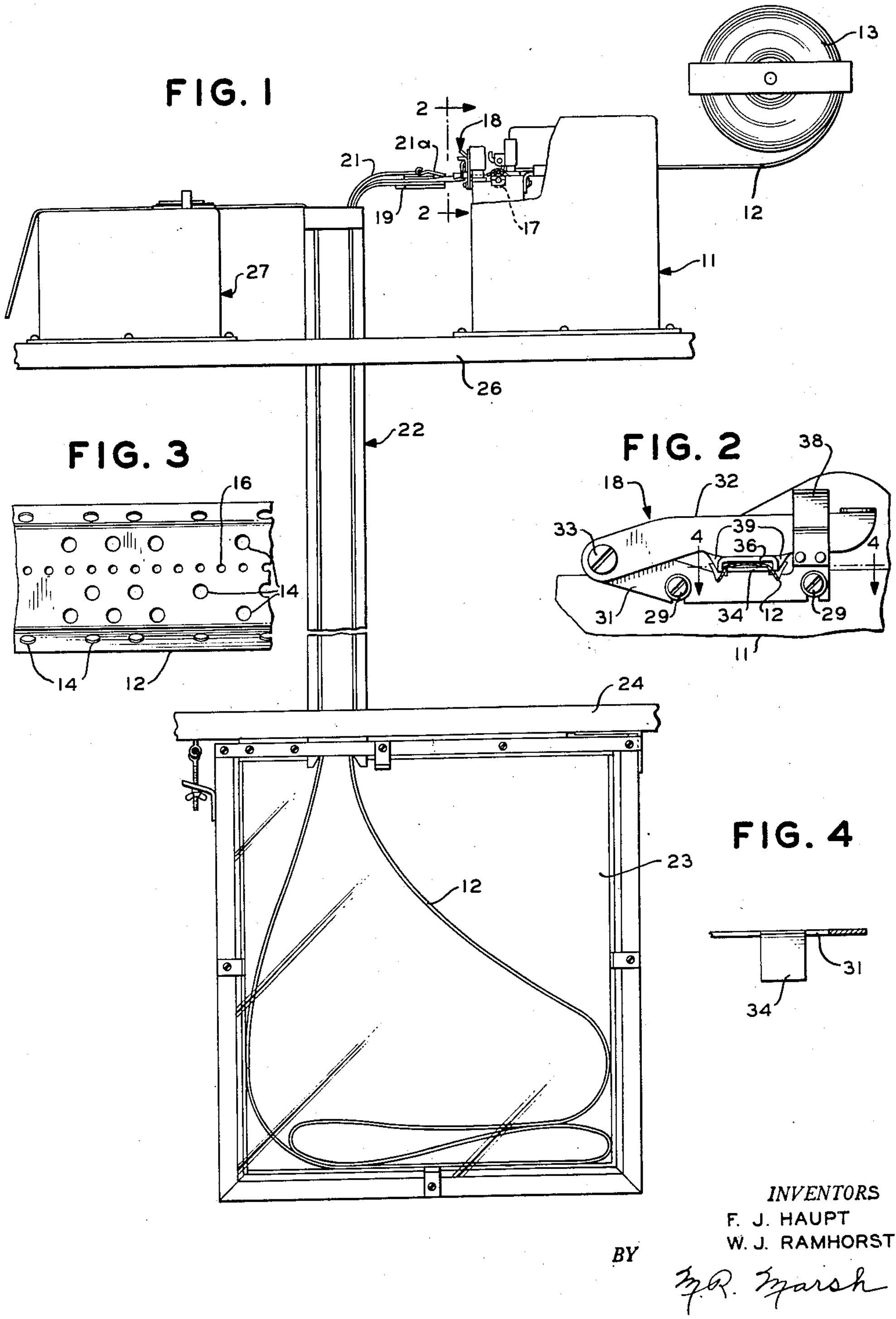
Fig. 1 is an elevational view showing the invention as it may be employed in conjunction with a telegraph storage tape, a reperforator, a guideway or chute leading to a tape storage bin and a tape transmitter.
Fig. 2 is a view taken substantially on line 2—2 of Fig. 1 showing the device of the present invention.
Fig. 3 is a face view of a short section of a perforated tape as it appears after passing through the device of the present invention.
Fig. 4 is a plan view of part of the lower element of the present invention taken substantially on line 4—4 of Fig. 2.

Referring now to the drawings, Fig. 1 shows a manner in which the equipment such as that, for example, at a sending position in a reperforator switching center may be arranged. In such an arrangement a signal controlled reperforator indicated generally by reference numeral 11 is supplied with a tape 12 from a supply roll 13 and perforates the tape in accordance with received signals. The reperforator 11 may be of the type disclosed in the patent to R. Hoover, No. 2,252,852, dated August 19, 1941, and is arranged to perforate each transverse section of the tape in accordance with received permutation code groups of signals. There are usually five code positions in a transverse section of the tape and the signals are represented by the presence or absence of a perforation in the code positions. An enlarged section of the perforated tape is shown in Fig. 3 and the code perforations are represented by reference numeral 14. Incident to the perforating of each signal code, a feed hole such as 16 is perforated. In conjunction with the perforation of each transverse section a feeding mechanism including a feedwheel 17 cooperating with the feed holes 16 advances the tape.

As the perforated tape 12 leaves the perforator 11 it is pushed through the device comprising the present invention, indicated in general by reference numeral 18, and then between a fixed guide plate 19 and a pair of pivoted plates 21 and 21_a_. The guide plates 19 and 21 direct and guide the perforated tape into the elongated guideway 22, the lower end of which terminates in a tape bin 23. The tape bin 23 may be secured to the underside of a tabletop 24 and the guideway 22 extends therefrom and up through a shelf 26 upon which the reperforator 11 is mounted.

Also mounted on the shelf 26 to the left of the upper end of the guideway 22 is a tape transmitter indicated generally by reference numeral 27 which includes means, such as sensing fingers, for sensing the perforations in the tape and tape advancing means for pulling the perforated tape out of the bin 23. Such tape transmitters are well known in the art and a more detailed description thereof is not believed necessary.

Figures 5, 6, 7, 8:
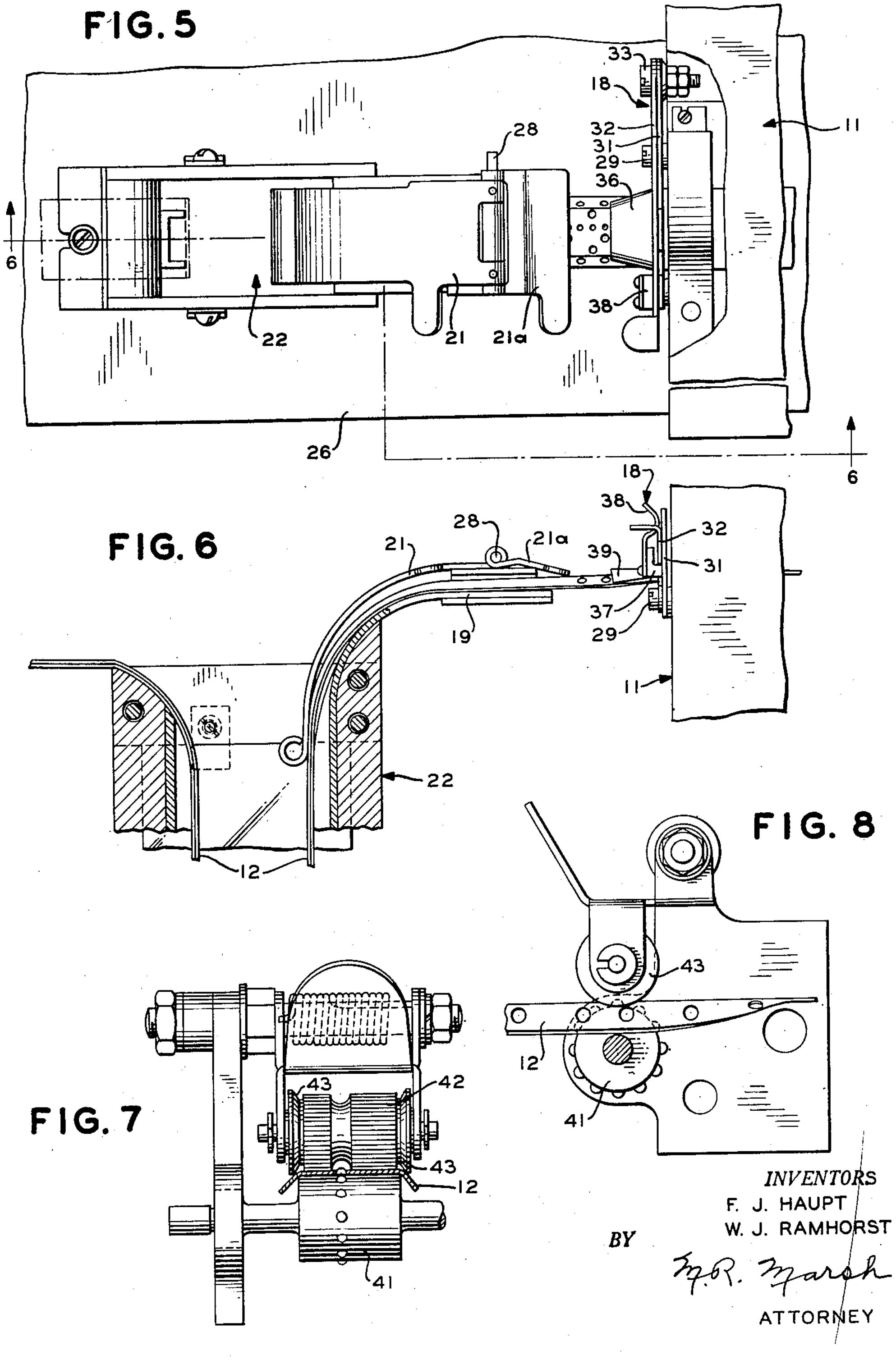
Fig. 5 is a plan view of the device of the present invention together with some of the associated equipment.
Fig. 6 is a sectional view taken substantially on line 6—6 of Fig. 5.
Fig. 7 is an elevational view of a modified form of the device of the present invention.
Fig. 8 is a right hand side view of the device of Fig. 7.

As more clearly shown in Figs. 5 and 6, the guide plate **21*a* as well as the curved guide plate 21 which assists in directing the tape into the guideway 22 are pivoted on a rod 28. When the tape transmitter 27 catches up with the reperforator 11 to cause the tape 12 to become taut the guide plate 21** pivots upwardly. This plate during such movement normally operates a switch (not shown) to stop further operation of the tape transmitter as is the usual arrangement in reperforator and tape transmitter installations.

The preferred modification of the device of the present invention is mounted on the side of the reperforator by screws such as 29 and as the tape issues from the transmitter it is pushed through the device 18. The device 18 consists essentially of two members, a lower member 31 fixed to the side of the reperforator and an upper pivoted member 32 pivoted by means of a screw 33 to the lower member. As more clearly shown in Fig. 4, the lower member 31 has extending horizontally from one side thereof a flat horizontal plate 34 over which the tape 11 passes as it issues from the reperforator. The plate 34 is somewhat less in width than the width of the tape for reasons hereinafter apparent.

Extending horizontally from the bottom side of the upper pivoted member 32 is a forming shoe 36. With the member 32 in an operative position, the shoe 36 is positioned directly above the plate 34. Fixed to the right hand end of the member 31 as shown in Fig. 2 is a combined stop 37 and detent spring 38. The stop 37, Fig. 6, limits the downward pivoting movement of the member 32 and the detent 38 detents it in this position. When in an operating position, as limited by the stop 37, the forming shoe 36 is located above the plate 34 with a space therebetween sufficient to permit the tape 12 to pass therebetween. This clearance may be in the order of four or five times the thickness of the tape. As best shown in Figs. 2 and 5, the forming shoe 36 has depending flanges 39 which extend down past the plate 34 and are arranged in such a manner that the upper surface 36 of the forming shoe progressively narrows in a direction away from the reperforator.

As the tape 12 issues from the reperforator and passes between the forming shoe 36 and plate 34, the depending flanges 39 progressively bend the edges of the tape down over the sides of the plate 34 and thus crease or crimp the tape so that it takes the form shown in Fig. 3 as it emerges from under the shoe 36. The width of the plate 34 and shoe 36 are such that the bending or creasing of the tape 12 occurs between the first and second and the fourth and fifth code areas. This creasing of the tape adds considerable to the stiffness thereof so that it can be readily pushed down the guideway 22 even though the tape transmitter 27 may be pulling another section of the tape up the guideway. However, the creasing of the tape which is sufficient to prevent or greatly decrease the tendency thereof to fold back and forth in the narrow guideway 22, does not materially prevent the tape from folding back and forth upon itself in the tape bin 23.

In the modification shown in Figs. 7 and 8, the crimping of the tape is performed at the feed wheel. Here the feed wheel 41 stepped in conjunction with the perforating operations is somewhat narrower than the tape and the pressure roller 42 has tapered flanges 43 adjacent the ends thereof which bend the tape down over the edges of the feed wheel 41. Thus, as the tape is advanced by the feed wheel 41, the pressure roller 42 pivotally mounted thereabove bends the edges of the tape down to crease the same. As in the preferred modification, the creasing by the pressure roller 42 occurs between the first and second and fourth and fifth signaling areas.

While the invention has been shown and described in but a preferred form and one modification thereof, it will be obvious that various other modifications may be made therein without departing from the spirit or essential attributes thereof, and it is desired therefore that only such limitations be placed thereon as are imposed by the appended claims.

What is claimed is:

1. In combination with a flexible signal storage tape and a perforating mechanism for selectively perforating said tape in longitudinal rows, a tape transmitter controlled by said perforated tape, a tape storage means between said perforating mechanism and said transmitter, means for creasing said tape in the direction of its length between longitudinal rows of perforations therein to stiffen the same prior to its entrance into said storage means, means including the stiffening caused by the creasing of said tape to enable the same to be pushed into said storage means and maintain in an orderly arrangement therein, means including said transmitter for pulling the tape from said storage means, and means for removing the crease from said tape in conjunction with the passage thereof through said transmitter.

2. In combination with a flexible signal storage tape and a perforating mechanism for selectively perforating said tape in longitudinal rows, a tape transmitter controlled by said perforated tape, a tape storage means between said perforating mechanism and said transmitter, means for creasing said tape in the direction of its length between longitudinal rows of perforations to stiffen the same prior to its entrance into said storage means, said creasing including the folding of at least one side section of said tape at an angle of less than 90°, means including said stiffened tape to enable the same to be pushed into said storage means and maintain in an orderly arrangement therein, and means including said transmitter for withdrawing the tape from said storage means and flattening the same in conjunction with the control of said transmitter by said tape.

References Cited in the file of this patent

UNITED STATES PATENTS

| | | |
|---|---|---|
| 693,572 | Shear | Feb. 18, 1902 |
| 732,212 | Newgarden | June 30, 1903 |
| 734,943 | Plimpton | July 28, 1903 |
| 1,060,740 | Cash | May 6, 1913 |
| 1,218,249 | Englert | Mar. 6, 1917 |
| 1,439,545 | Gordon | Dec. 19, 1922 |
| 1,692,236 | Wheildon | Nov. 20, 1928 |
| 2,259,517 | Drenkard | Oct. 21, 1941 |
| 2,430,463 | Gilbert | Nov. 11, 1947 |